US008666717B2

(12) United States Patent
Dasari et al.

(10) Patent No.: US 8,666,717 B2
(45) Date of Patent: Mar. 4, 2014

(54) SAND AND FLUID PRODUCTION AND INJECTION MODELING METHODS

(75) Inventors: Ganeswara R. Dasari, Pearland, TX (US); David P. Yale, Milford, NJ (US); Jianlin Wang, Sugar Land, TX (US)

(73) Assignee: ExxonMobil Upstream Resarch Company, Houston, TX (US)

( * ) Notice: Subject to any disclaimer, the term of this patent is extended or adjusted under 35 U.S.C. 154(b) by 119 days.

(21) Appl. No.: 13/120,115

(22) PCT Filed: Sep. 21, 2009

(86) PCT No.: PCT/US2009/057720
§ 371 (c)(1),
(2), (4) Date: Mar. 21, 2011

(87) PCT Pub. No.: WO2010/059288
PCT Pub. Date: May 27, 2010

(65) Prior Publication Data
US 2011/0213602 A1    Sep. 1, 2011

Related U.S. Application Data

(60) Provisional application No. 61/116,549, filed on Nov. 20, 2008.

(51) Int. Cl.
*G06G 7/48* (2006.01)
*G06G 7/50* (2006.01)

(52) U.S. Cl.
USPC .............................................. 703/10; 703/9

(58) Field of Classification Search
USPC ............... 703/10, 9; 6/10; 166/266, 306, 369
See application file for complete search history.

(56) References Cited

U.S. PATENT DOCUMENTS 4,398,769 A    8/1983  Jacoby
4,406,499 A    9/1983  Yildirim
(Continued)

FOREIGN PATENT DOCUMENTS

CA    1017368    9/1977
CA    1018556    10/1977
(Continued)

OTHER PUBLICATIONS

Zheng et al., Adaptive unstructured volume remeshing—II: Application to two- and three-dimensional level-set simulations of multiphase flow, 2005.*
(Continued)

*Primary Examiner* — Kamini S Shah
*Assistant Examiner* — Andre Pierre Louis
(74) *Attorney, Agent, or Firm* — ExxonMobil Upstream Research Company-Law Department

(57) ABSTRACT

Methods for modeling subsurface reservoirs are provided. In at least one embodiment, the process includes building a numerical model of a reservoir having at least one injection well and at least one producing well, and incorporating at least one of an Eulerian boundary condition (EBC) into each of the at least one injection well and at least one producing well, an advanced constitutive model (ACM) int the reservoir, and an adaptive re-meshing technique (ART) into the reservoir model. Then generating a simulation result from the integrated reservoir model, wherein the simulation result includes at least a volume of produced fluids and produced particulate solids from the reservoir, a volume of injected fluids and injected particulate solids into the reservoir, and a simulation of movement of at least a volume of particulate solids and fluids in the reservoir.

24 Claims, 10 Drawing Sheets

(56) References Cited

U.S. PATENT DOCUMENTS

| | | | |
|---|---|---|---|
| 4,437,706 | A | 3/1984 | Johnson |
| 4,452,491 | A | 6/1984 | Seglin et al. |
| 4,550,779 | A | 11/1985 | Zakiewicz |
| 4,575,155 | A | 3/1986 | Hodges |
| 4,964,101 | A | 10/1990 | Liu et al. |
| 5,095,982 | A | 3/1992 | Peng et al. |
| 5,253,707 | A | 10/1993 | Schmidt et al. |
| 5,335,732 | A | 8/1994 | McIntyre |
| 5,473,334 | A | 12/1995 | Yee et al. |
| 5,593,248 | A | 1/1997 | Kansa et al. |
| 5,823,631 | A | 10/1998 | Herbolzheimer et al. |
| 6,002,063 | A | 12/1999 | Bilak et al. |
| 6,152,356 | A | 11/2000 | Minden |
| 6,481,500 | B1 | 11/2002 | Burd et al. |
| 6,516,292 | B2 | 2/2003 | Yahalom et al. |
| 6,651,742 | B2 | 11/2003 | Burd et al. |
| 6,665,636 | B1 | 12/2003 | Allouche et al. |
| 6,679,326 | B2 | 1/2004 | Zakiewicz |
| 6,823,297 | B2 | 11/2004 | Jenny et al. |
| 6,904,366 | B2 | 6/2005 | Patzek et al. |
| 6,928,399 | B1 | 8/2005 | Watts, III et al. |
| 6,980,940 | B1 | 12/2005 | Gurpinar et al. |
| 7,069,990 | B1 | 7/2006 | Bilak |
| 7,100,994 | B2 | 9/2006 | Vinegar et al. |
| 7,104,320 | B2 | 9/2006 | Buchanan et al. |
| 7,165,613 | B2 | 1/2007 | Chan et al. |
| 7,181,380 | B2 | 2/2007 | Dusterhoft et al. |
| 7,200,539 | B2 | 4/2007 | Ong et al. |
| 8,313,152 | B2 | 11/2012 | Brock et al. |
| 2002/0013687 | A1 | 1/2002 | Ortoleva |
| 2003/0201098 | A1 | 10/2003 | Karanikas et al. |
| 2007/0199705 | A1 | 8/2007 | Hocking |
| 2008/0133194 | A1 | 6/2008 | Klumpen et al. |
| 2009/0236103 | A1 | 9/2009 | Yale et al. |
| 2010/0218954 | A1 | 9/2010 | Yale et al. |
| 2010/0250206 | A1* | 9/2010 | Yogeswaren ............... 703/2 |
| 2011/0120704 | A1 | 5/2011 | Best |
| 2011/0315397 | A1 | 12/2011 | Best |

FOREIGN PATENT DOCUMENTS

| | | |
|---|---|---|
| CA | 1053573 | 5/1979 |
| CA | 1151529 | 8/1983 |
| CA | 1186987 | 5/1985 |
| CA | 2055549 | 5/1993 |
| CA | 2277528 | 1/2001 |
| CA | 2423232 | 4/2002 |
| CA | 2491942 | 1/2004 |
| WO | WO99/45228 | 9/1999 |
| WO | WO99/57418 | 11/1999 |
| WO | WO03/035801 | 5/2003 |
| WO | WO2006/138565 | 12/2006 |
| WO | WO2008/064305 | 5/2008 |
| WO | WO2009/114146 | 9/2009 |

OTHER PUBLICATIONS

Yogeswaren 61098123 Proviional Application, whole document 2008.*

Jesper Madsen (Computational and Experimental study of sprays from the breakup of water sheets, (260 pages), 2006).*

Bratli RK et al. (1981). "Stability and Failure of Sand Arches", *SPE Journal*, 883-898.

Bruno, MS, et al. (1995). "Economic Disposal of Solid Oil Fill Waste Through Slurry Fracture Injection", *SPE* 29646.

Bruno, MS, et al. (2001). "Coupled Particle and Fluid Flow Modeling of Fracture and Slurry Injection in Weakly Consolidated Granular Media", *Proc. 38th US Rock Mech. Symposium*, Washington D.C. Jul. 7-10, 2001.

Dusseault, M.B. (1995). "Slurry Fracture Injection", *Hazardous Materials Management* pp. 16-17.

Geilikman M. B., et al. (1997). "Fluid Rate Enhancement From Massive Sand Production in Heavy-Oil Reservoirs", *J. Petr. Sci. Eng.*, 17, 5-18.

Han, G. et al: "How much oil you can get from CHOPS", *Journal of Canadian Petroleum Technology*, Apr. 2007 Petroleum Society CA, vol. 46, No. 4, pp. 24-32.

Minkoff S.E. et al, (2003) "Coupled Fluid Flow and Geomechanical Deformation Modeling", *Journal of Petroleum Science and Engineering*, vol. 38, pp. 37-56.

Morita N, et al. (1989). "Realistic Sand-Production Prediction: Numerical Approach", *SPE Production Engineering*, Feb. 1989, 25-33.

Papamichos E et al. (1996). "An Erosion-mechanical Model for Sand Production Rate Prediction", *Intl. Journal of Rock Mechanics and Mining Sciences*, vol. 35, 531-532.

Perkins T. K. et al. (1988). "Stability and Failure of Spherical Cavities in Unconsolidated Sand and Weakly Consolidated Rock", $63^{rd}$ *Annual Tech. Conf. and Exhibition of the Society of Petroleum Engineers in Houston, TX*, Oct. 2-5, SPE 18244.

Ramos G.G. (1994). "Sand Production in Vertical and Horizontal Wells in a Friable Sandstone Formation North Sea". *SPE/ISRM Rock Mechanics in Petroleum Engineering conference held in Delft, The Netherlands*, Aug. 29-31, SPE28065.

Salama M.M., et al. (1983). "Evaluation of API RP 14E Erosional Velocity Limitations in Offshore Gas Wells", *Proc. the $15^{th}$ Annual Offshore Technology Conference*, Houston, Texas. OTC 4485.

Settari, A. et al. (2001) "Advances in Coupled Geomechanical and Reservoir Modeling With Applications to Reservoir Compaction", *SPE Reservoir Simulation Symposium*, Houston Apr. 14-17, SPE 51927.

Sipple-Srinivasan, M. M et al., (1998). "Disposal of Crude Contaminated Soil Through Slurry Fracture Injection at the West Coyote Field in California", *SPE Western Regional Meeting*, Bakersfield, CA. May 10-13; SPE 46239.

van den Hoek, P.J., et al. (2000). "A New Concept of Sand Production Prediction: Theory and Laboratory Experiments", 1996 SPE Annual Tech. Conf., Denver, Colorado. Oct. 6-9; SPE 36418.

van den Hoek, P.J., et al.(2000) "Mechanisms of Downhole Sand Cavity Re-Stabilisation in Weakly Consolidated Sandstones" *SPE European Petroleum Conference* in Paris, France, Oct. 24-25; SPE 65183.

Vardoulakis, I., et al. (1996) "Hydro-Mechanical Aspects of the Sand Production Problem", *Journal of Transport in Porous Media*, 22: 225-244.

Veeken, C.A.M., et al. (1991). "Sand Production Prediction Review: Developing an Integrated Approach", *Proc. of $66^{th}$ Annual Technical Conference and Exhibition of SPE*, Dallas, Texas. Oct. 6-9; SPE 22792.

Wan, R.G., et al. (2004). "Analysis of Sand Production in Unconsolidated Oil Sand Using a Coupled Erosional-Stress-Deformation Model" *Journal of Canadian Petroleum Technology*, vol. 43, No. 2, pp. 47-53.

Wang, J, et al. (2005), "Prediction of Volumetric Sand Production and Wellbore Stability Analysis of a Well at Different Completion Schemes", *Alaska Rocks 2005, The 40th U.S. Symposium on Rock Mechanics* (USRMS): held in Anchorage, Alaska, Jun. 25-29.

Wang, Z. et al, (2005) "A Study of Fluid-Flow Mechanism for Cold Production With Sand and Single-Well Fine Numerical Simulation in Heavy-Oil Reservoirs", *SPE International Thermal Operations and Heavy Oil Symposium* held in Calgary, Alberta, Canada Nov. 1-3; XP002541419.

Yi, X. et al., (2005) "Effect of Rock Strength Criterion on the Predicted Onset of Sand Production", *International Journal of Geomechanics*, vol. 5, pp. 66-73 (2005).

EP Search Report, Aug. 27, 2009, Application No. 09157500.1-2224.

International Search Report, Nov. 10, 2009, Application No. PCT/US2009/057720.

Abaqus (2007). ABAQUS user manuals, ABAQUS Inc, Providence, RI, USA, section 14.1.2.

Rockfield (2007). User manuals for ELFEN finite element software, Rockfield Software Ltd, Swansea, UK., Chapter 1.

* cited by examiner

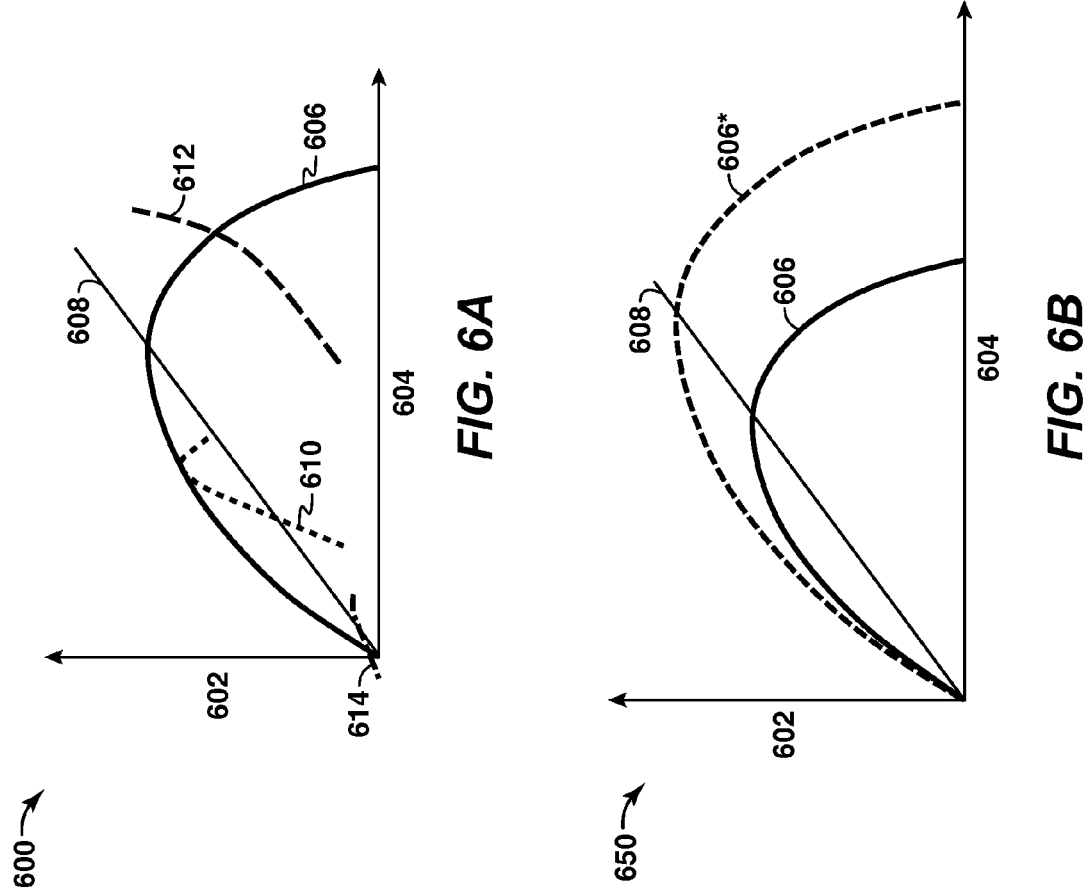

SAND AND FLUID PRODUCTION AND INJECTION MODELING METHODS

CROSS REFERENCE TO RELATED APPLICATIONS

This application is the National Stage of International Application No. PCT/US2009/057720, filed 21 Sep. 2009, which claims the benefit of U.S. Provisional Application No. 61/116,549, filed 20 Nov. 2008.

FIELD OF THE INVENTION

Embodiments of the invention relate to methods of modeling sand and fluid production from a subsurface formation, and sand and fluid injection into a subsurface formation. More particularly, embodiments of the invention relate to methods for modeling reservoirs using numerical analysis to more accurately predict reservoir behavior during production and injection of sand and fluids.

BACKGROUND OF THE INVENTION

This section is intended to introduce various aspects of the art, which may be associated with exemplary embodiments of the present invention. This discussion is believed to assist in providing a framework to facilitate a better understanding of particular aspects of the present invention. Accordingly, it should be understood that this section should be read in this light, and not necessarily as admissions of prior art.

DESCRIPTION OF THE RELATED ART

Bitumen is any heavy oil or tar with viscosity more than 10,000 cP found in porous subsurface geologic formations. Bitumen is often entrained in sand, clay, or other porous solids and is resistant to flow at subsurface temperatures and pressures. Current recovery methods inject heat or viscosity reducing solvents to reduce the viscosity of the bitumen and allow it to flow through the subsurface formations and to the surface through boreholes or wellbores. Other methods breakup the sand matrix in which the heavy oil is entrained by water injection to produce the formation sand with the oil; however, the recovery of bitumen using water injection techniques is limited to the area proximal the bore hole. These methods generally have low recovery ratios and are expensive to operate and maintain. However, there are hundreds of billions of barrels of these very heavy oils in the reachable subsurface in the province of Alberta alone and additional hundreds of billions of barrels in other heavy oil areas around the world. Efficiently and effectively recovering these resources for use in the market is one of the world's toughest energy challenges.

Extracting bitumen from oil sand reservoirs generally leads to production of sand, limestone, clay, shale, bitumen, asphaltenes, and other in-situ geo-materials (herein collectively referred to as sand or particulate solids) in methods such as Cold Heavy Oil Production with Sand (CHOPS), Cyclic Steam Stimulation (CSS), Steam Assisted Gravity Drainage (SAGD), and Fluidized In-situ Reservoir Extraction (FIRE). The amount of sand and water produced may vary from very small to large and it depends on the type of method, stress-state within the reservoir, drawdown and depletion. In cases of CSS and SAGD, sand production is not desirable. On the other hand, sand production is encouraged in cases of CHOPS and FIRE (International Patent Application Publication WO2007/050180) processes. When the amounts of sand and water produced are very large, it is important to be able to safely dispose the sand and water back into subsurface. Feasibility, safety and optimization of such complex large scale production and disposal of materials require realistic simulation models.

The very early methods for predicting sand production are based on empirical relations, which depend on fluid velocity, strength of the formation, grain size, etc. These methods are not suitable to evaluate the interaction between the reservoir, injected material and the surrounding formation.

Finite element methods have also been used to predict limited sand production (Yi et al.—Ref #1). Ong et al. (Ref #2) presented a method for predicting the on-set of sand production in terms of Critical Drawdown Pressure in high flow rate gas wells. The fluid flow principles are coupled with a Mohr-Coulomb material model. Sand production was assumed to initiate when the drawdown pressure condition induces tensile stresses. In all these simulations, rock volume around the wellbore experiencing at least one of the failures (compression, shear and erosion) is computed as a function of time. The sand production rates are calculated by assuming that the failed sand will be produced. These models do not simulate actual sand production. Rather, they simulate failure of sand, which is merely an indication of sand production. These models also fail to account for addition or removal of material (e.g., sand) to or from the reservoir.

Wan and Wang (Ref #3) presented a different method to predict sand production based on mixture theory with erosion mechanics. This method assumes that mobilized sand is one of the internal variables in the governing equations. This model also fails to simulate the removal of material from the reservoir. Instead, the sand production rate is calculated as an internal variable.

Existing models, such as those disclosed above, are suitable where the amount of sand produced is small. However, when sand production rates are large (e.g., in the FIRE process) these models are generally inaccurate. To account for pressure, flow, stress, and deformation interactions between produced/injected/remaining sand, reservoir fluids, and overburden/sideburden/underburden formations. Moreover, these methods do not address the simulation of injection of sand and slurry back into the sub-surface.

Injection of solids and fluids into subsurface is a relatively new concept. Currently, the injections are carried out to dispose solid and fluid waste in petroleum, nuclear and mining industries for environmental reasons. Generally, the waste is disposed into a fracture created by high pressure injection into a target formation (Sipple-Srinivasan et al.—Ref. #4). Bruno et al. (Ref #5) proposed a method coupling fluid flow and mechanical behavior of sand to simulate injection of material into subsurface.

Bilak et al (Ref #6) patented a method to inject slurried waste material into porous, permeable formations. Bilak (Ref #7) patented similar technique for enhanced oil recovery from heavy oil formations by high pressure injection of substances (e.g., slurried wastes) into a reservoir. The substances are injected into a fracture induced by continuous high pressure injections. The processes and simulation methods described for injecting waste materials are generally only suitable when the waste material is small in volume compared to the volume of the injected formation.

Recently many researchers (e.g., Settari and Walters (Ref. #8), and Minkoff et al. (Ref #9)) presented coupled geomechanical and reservoir modeling technique to compute reservoir compaction. Such coupled models have been implemented in some commercial software (e.g., VISAGE™). These coupled models may simulate injection of fluids, but they do not simulate injection of solids into reservoir. These coupled models simulate interaction between reservoir solids and fluids when deformation experienced by solids is small and they are not suitable for simulating very large strains which are common when significant portions of the reservoir sand is produced in processes like FIRE.

What is needed is a simulation technology to simulate movement of large quantities of sand and fluid for production and injection processes.

Citations to references: 1. Yi et al., "*Effect of Rock Strength Criterion on the Predicted Onset of Sand Production*", International Journal of Geomechanics, vol. 5, pp. 66-73 (2005); 2. U.S. Pat. No. 7,200,539 (Ong, et al.); 3. Wan and Wang, "*Analysis of Sand Production in Unconsolidated Oil Sand Using a Coupled Erosional-Stress-Deformation Model*", Journal of Canadian Petroleum Technology, 43:2, pp. 47-53 (2004); 4. Sipple-Srinivasan et al., "*Disposal of Crude Contaminated Soil Through Slurry Fracture Injection at the West Coyote Field in California*", SPE 46239, (1998); 5. Bruno et al., "*Coupled Particle and Fluid Flow Modeling of Fracture and Slurry Injection in Weakly Consolidated Granular Media*", Proc. 38th US Rock Mech. Symposium, Washington D.C. (Jul. 7-10 2001); 6. U.S. Pat. No. 6,002,063 (Bilak, et al.); 7. U.S. Pat. No. 7,069,990 (Bilak); 8. Settari and Walters, "*Advances in Coupled Geomechanical and Reservoir Modeling With Applications to Reservoir Compaction*", SPE 51927, (Feb. 14-17, 1999); 9. Minkoff et al., "*Coupled Fluid Flow and Geomechanical Deformation Modeling*", Journal of Petroleum Science and Engineering, vol. 38, pp. 37-56 (2003).

SUMMARY OF THE INVENTION

In one embodiment of the present invention a method of reservoir modeling is provided. The method includes generating an integrated reservoir model. The step of generating the integrated reservoir model includes building a numerical model of a reservoir having at least one injection well and at least one producing well; and incorporating an Eulerian boundary condition (EBC) into each of the at least one injection well and at least one producing well. The method further includes generating a simulation result from the integrated reservoir model, wherein the simulation result includes at least a volume of produced fluids and produced particulate solids from the reservoir and a volume of injected fluids and injected particulate solids into the reservoir. In some embodiments, the method includes incorporating an advanced constitutive model (ACM) into the integrated reservoir model, wherein the simulation result further includes at least a simulation of movement of at least a volume of particulate solids and fluids in the reservoir. In another embodiment, the method includes incorporating an adaptive re-meshing technique (ART) into the integrated reservoir model, wherein the adaptive re-meshing technique is configured to produce at least a simulation of movement of at least a volume of particulate solids and fluids in the reservoir. Alternatively, the method may incorporate each of and EBC, ACM, and ART. In some embodiments of the present invention, the integrated reservoir model is a fluid flow and deformation model.

In another embodiment of the present invention another method of reservoir modeling is provided. The method includes generating an integrated reservoir model. Generating the integrated reservoir model includes building a numerical model of a reservoir, then incorporating at least one of an advanced constitutive model (ACM) and an adaptive re-meshing technique (ART) into the integrated reservoir model. The method further includes generating a simulation result from the integrated reservoir model, wherein the simulation result includes at least a simulation of movement of at least a volume of particulate solids and fluids in the reservoir using at least one of the ACM and ART. Additionally, the method may include building the numerical model of the reservoir having at least one injection well and at least one producing well and incorporating an Eulerian boundary condition (EBC) into each of the at least one injection well and at least one producing well, then generating a simulation result from the integrated reservoir model, wherein the simulation result includes at least a volume of produced fluids and produced particulate solids from the reservoir and a volume of injected fluids and injected particulate solids into the reservoir.

BRIEF DESCRIPTION OF THE DRAWINGS

The foregoing and other advantages of the present invention may become apparent upon reviewing the following detailed description and drawings of non-limiting examples of embodiments in which:

FIG. 6A is an illustration of an exemplary graph showing various stress paths due to sand and water production and injection in a critical state constitutive model;

FIG. 6B is an illustration of an exemplary graph showing a rate-dependent version of the critical state constitutive model of FIG. 6A;

DETAILED DESCRIPTION OF THE INVENTION

Figure 1A:
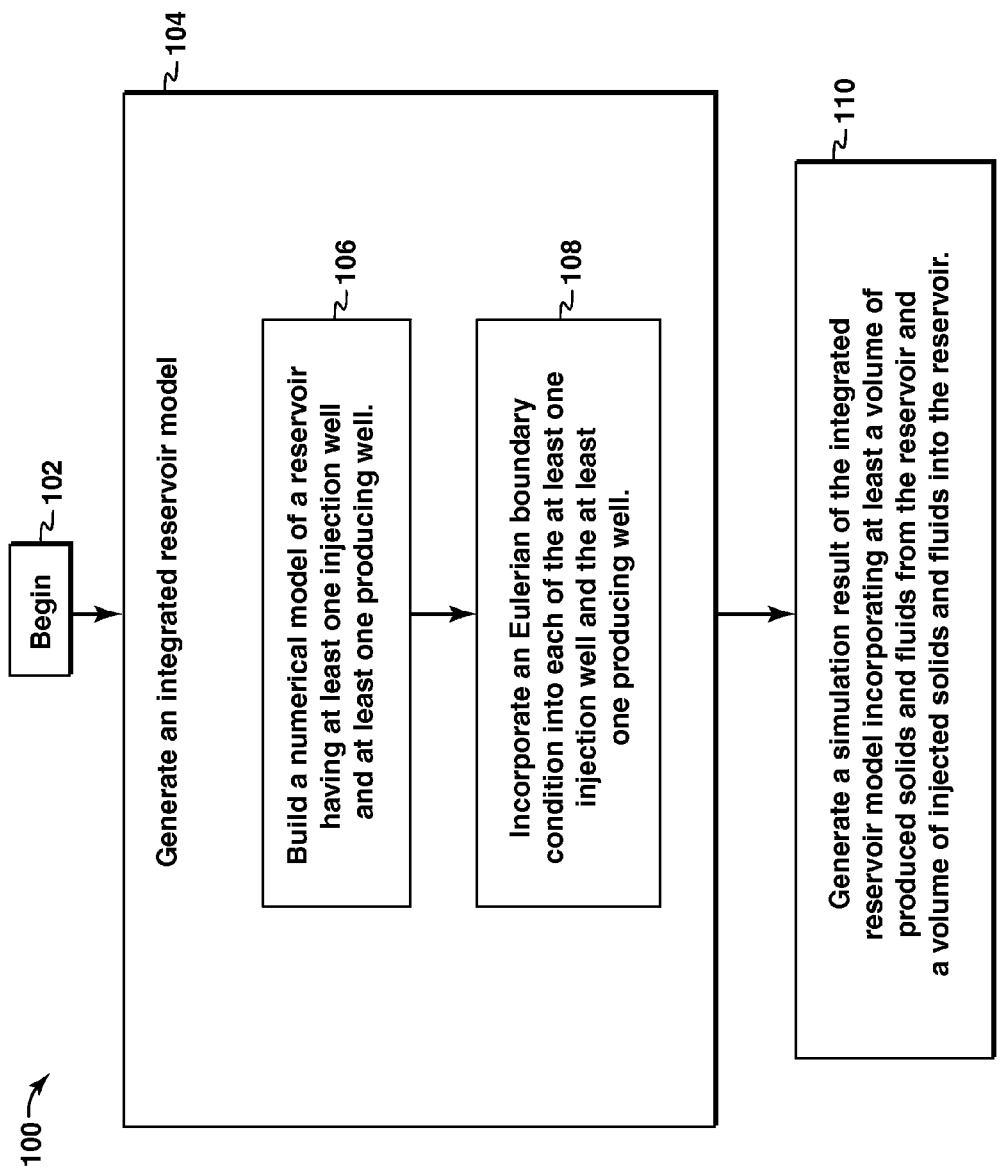
FIGS. 1A-1B are process flow charts for methods of reservoir modeling.

In the following detailed description section, the specific embodiments of the present invention are described in connection with preferred embodiments. However, to the extent that the following description is specific to a particular embodiment or a particular use of the present invention, this is intended to be for exemplary purposes only and simply provides a description of the exemplary embodiments. Accordingly, the invention is not limited to the specific embodiments described below, but rather, it includes all alternatives, modifications, and equivalents falling within the true spirit and scope of the appended claims.

The term "formation" refers to a body of rock or other subsurface solids that is sufficiently distinctive and continuous that it can be mapped. A "formation" can be a body of rock of predominantly one type or a combination of types. A formation can contain one or more hydrocarbon-bearing zones. Note that the terms "formation," "reservoir," and "interval" may be used interchangeably, but will generally be used to denote progressively smaller subsurface regions, zones or volumes. More specifically, a "formation" will generally be the largest subsurface region, a "reservoir" will generally be a region within the "formation" and will generally be a hydrocarbon-bearing zone (a formation, reservoir, or interval having oil, gas, heavy oil, and any combination thereof), and an "interval" will generally refer to a sub-region or portion of a "reservoir."

A hydrocarbon-bearing zone can be separated from other hydrocarbon-bearing zones by zones of lower permeability such as mudstones, shales, or shaley (highly compacted) sands. In one or more embodiments, a hydrocarbon-bearing zone includes heavy oil in addition to sand, clay, or other porous solids.

The term "heavy oil" refers to any hydrocarbon or various mixtures of hydrocarbons that occur naturally, including bitumen and tar. In one or more embodiments, a heavy oil has a viscosity of between 1,000 centipoise (cP) and 10,000 cP. In one or more embodiments, a heavy oil has a viscosity of between 10,000 cP and 100,000 cP or between 100,000 cP and 1,000,000 cP or more than 1,000,000 cP at subsurface conditions of temperature and pressure.

The term "overburden" refers to the sediments or earth materials overlying the formation containing one or more hydrocarbon-bearing zones. The term "overburden stress" refers to the load per unit area or stress overlying an area or point of interest in the subsurface from the weight of the overlying sediments and fluids. In one or more embodiments, the "overburden stress" is the load per unit area or stress overlying the hydrocarbon-bearing zone that is being conditioned and/or produced according to the embodiments described.

Horizontal effective stresses ($\sigma'_h$ and $\sigma'_H$) on any given volume of reservoir rock may be defined as:

$$\sigma'_h = \sigma_h - p_f \quad \text{Eq. 1}$$

$$\sigma'_H = \sigma_H - p_f \quad \text{Eq. 2}$$

Where "$\sigma_h$" and "$\sigma_H$" are the minimum and maximum total stresses acting on the reservoir in the horizontal direction, and "$p_f$" is the fluid pressure in the reservoir. Similarly, the vertical effective stress ($\sigma'_v$) on the reservoir may be defined as:

$$\sigma'_v = \sigma_v - p_f \quad \text{Eq. 3}$$

and the differential stress (q) for simple cases may be defined as:

$$q = \sigma'_H - \sigma'_v \quad \text{Eq. 4}$$

The mean effective stress ($\sigma'_m$ or p') in the reservoir may then be defined as:

$$p' = (\sigma'_H + \sigma'_h + \sigma'_v)/3 \quad \text{Eq. 5}$$

The present disclosure teaches methods of transforming data into an integrated reservoir fluid flow and deformation model (herein after referred as integrated reservoir model) which can simulate both production and injection processes. The integrated reservoir model combines a geologic model, a classical reservoir fluid flow model and a geo-mechanical deformation model into a single integrated model.

The present disclosure includes a method for simulating the conditioning (through water injection) of a reservoir in a subsurface formation, simulating sand, bitumen and water production and sand and water injection by combining Eulerian boundaries, automatic mesh refinement, advanced constitutive models, large strain formulations of geomechanics and fluid flow principles. The disclosed methods combine multiple modeling tools in a new way to solve a new boundary value problem and obtain new results useful in reservoir modeling and predictive reservoir simulations. The disclosed methods are particularly suited for use in modeling reservoirs containing heavy oil and sand where the production method includes injection, production, and/or movement of large amounts of sand and fluids.

Exemplary production methods include Cold Heavy Oil Production with Sand (CHOPS), modified CHOPS, single well borehole mining and multiwell in-situ bitumen mining methods such as Fluidized In-situ Reservoir Extraction (FIRE). Further discussion of FIRE can be found in International Application No. PCT/US08/74342, which is hereby incorporated by reference. In the CHOPS method, there is generally no conditioning step. Rather, the reservoir (e.g., production zone) has sufficient drive energy and other characteristics to produce sand and oil without such a conditioning step. However, in the FIRE process, the reservoir is conditioned prior to production. The conditioning step includes injection of fluids to increase fluid pressure, change the stress profile of the reservoir, and generally make the reservoir more suitable for solids production. The modeling methods of the present disclosure are well suited to account for fluid and solids ingress and egress to and from the reservoir of interest.

In one embodiment of the present invention, a method for reservoir modeling is provided, including generating an integrated reservoir model. The integrated reservoir model includes a numerical model of a reservoir having at least one injection well and at least one production well and incorporates an Eulerian boundary condition into each of the at least one injection well and at least one production well. The method further includes generating a simulation result from the integrated reservoir model, the simulation result including at least a volume of produced fluids and produced particulate solids from the reservoir and a volume of injected fluids and injected particulate solids into the reservoir. The integrated reservoir model may additionally include an advanced constitutive model and/or an adaptive re-meshing technique, each of which are configured to simulate the movement of sand and fluids in the reservoir. In yet another embodiment, the simulation result is generated using a numerical simulation technique selected from the group consisting of a finite element method, a discrete element method, a finite volume method, and any combination of these methods.

Alternatively, the integrated reservoir model may include a numerical model of a reservoir with or without the injection and production wells. The method further includes integrating at least one of an advanced constitutive model (ACM) and an adaptive re-meshing technique (ART) into the numerical reservoir model. Each of the ACM and the ART are configured to simulate the movement of sand and fluids in the reservoir. Additionally, injection and production wells may be added to the integrated reservoir model and integrated with an Eulerian boundary condition (EBC) to simulate the ingress and egress of particulate solids (e.g., sand) and fluids into and out of the reservoir. In short, any combination of EBC, ART, and ACM may be used to model a reservoir and simulate the movement, production, and/or injection of sand and fluids in the reservoir. Although the methods of the present disclosure are applicable to any reservoir, they are likely most useful in reservoirs containing significant amounts of particulate solids (e.g., sand) with heavy oil (e.g., greater than about 1,000 cP viscosity and less than about 15 API gravity) and an overburden.

In yet an additional embodiment, a computer program product is provided. The computer program product includes a computer usable medium having a computer readable program code embodied therein, said computer readable program code adapted to be executed to implement at least one of the methods for reservoir modeling disclosed herein.

Figure 1B:
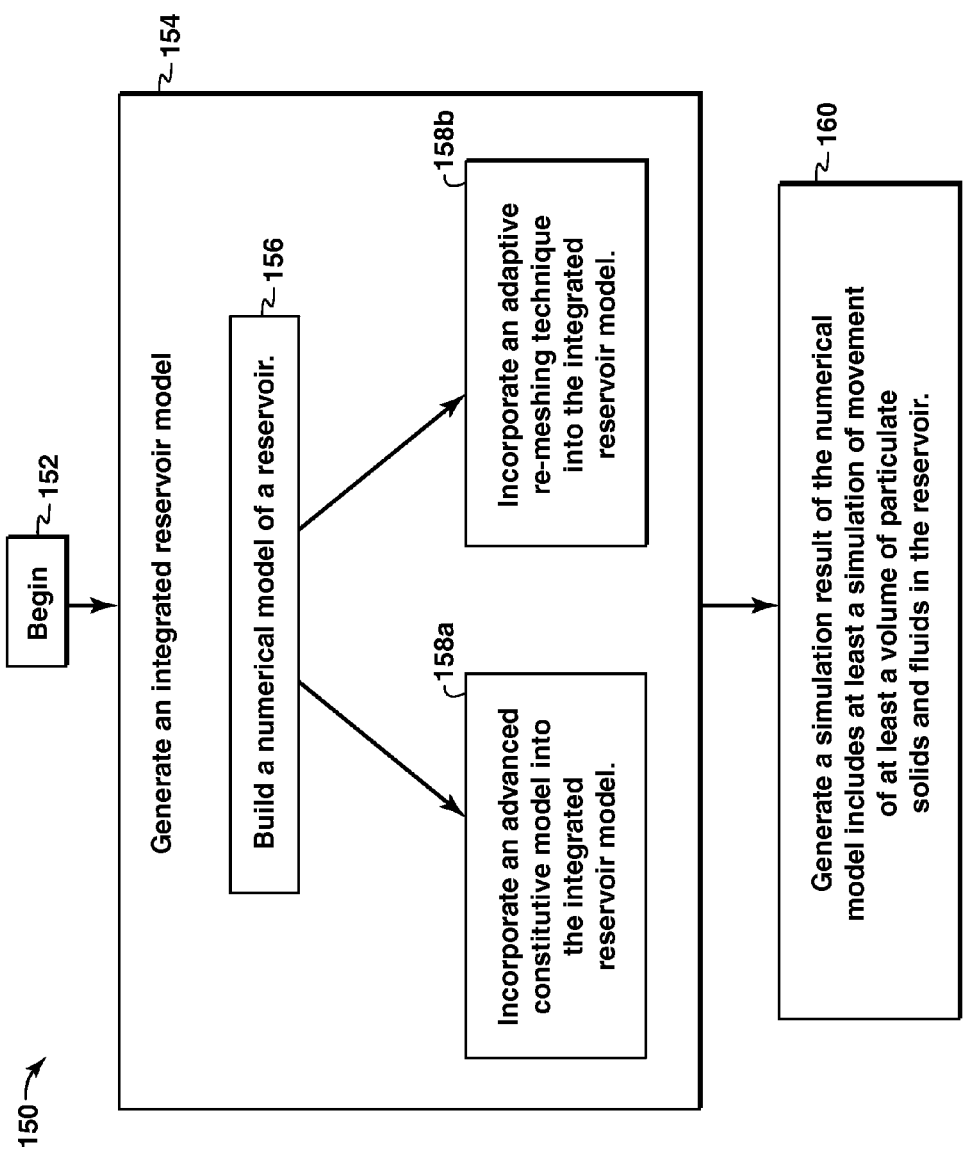

Referring now to the figures, FIGS. 1A-1B are process flow charts for methods of reservoir modeling according to the present disclosure. FIG. 1A shows a method 100, which begins at block 102 and includes generating an integrated reservoir model 104, which includes building a numerical model of a reservoir 106 having at least one injection well and at least one producing well and incorporating an Eulerian boundary condition (EBC) 108 into each of the at least one injection well and at least one producing well. The method 100 then includes generating a simulation result from the integrated reservoir model 110, wherein the simulation result includes at least a volume of produced fluids and produced particulate solids from the reservoir and a volume of injected fluids and injected particulate solids into the reservoir.

FIG. 1B shows a method 150, which begins at block 152 and includes generating an integrated reservoir model 154, which includes building a numerical model of a reservoir 156. Next, the method 150 includes incorporating one or both of an advanced constitutive model (ACM) 158a and an adaptive re-meshing technique (ART) 158b into the integrated reservoir model. Then, generating a simulation result of the numerical model 150 including at least a simulation of movement of at least a volume of particulate solids and fluids in the reservoir.

Optionally, the method 100 may further include incorporating the ACM 158a and/or the ART 158b into the integrated reservoir model and further including the simulation of movement of at least the volume of particulate solids and fluids in the reservoir into the simulation result. Alternatively, the method 150 may further include adding the injection well and production well to the numerical model 106, then integrating the EBC into each of the injection and production wells 108 and generating the simulation result 110 incorporating at least a volume of produced solids and fluids from the reservoir and a volume of injected solids and fluids into the reservoir.

Figure 2:
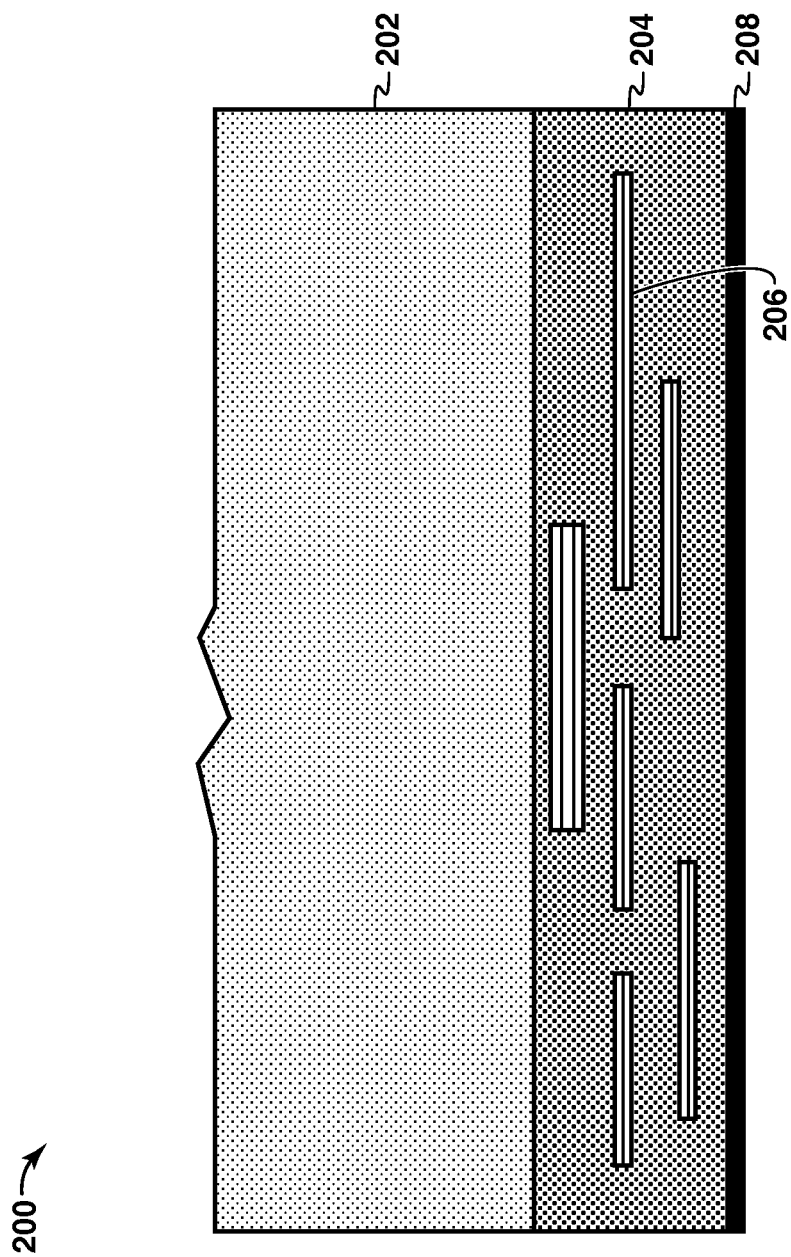
FIG. 2 is a schematic illustration of an exemplary reservoir that may be modeled using the methods of FIGS. 1A-1B.

FIG. 2 is a schematic illustration of an exemplary reservoir that may be modeled using the methods of FIGS. 1A-1B. As such, FIG. 2 may be best understood with reference to FIGS. 1A-1B. The reservoir 200 includes an overburden 202, a production zone 204, at least one heterogeneity 206, and a fracture (or alternatively, an underburden) 208. Note, the exemplary reservoir 200 is a reservoir in its "natural" or "initial" state before any injection wells and production wells (not shown) are added and before any liquids and solids are injected or produced, which generally changes the appearance of the reservoir. Further, the production zone 204 may include heavy oil and particulate solids in addition to the heterogeneities 206.

Figure 3A:
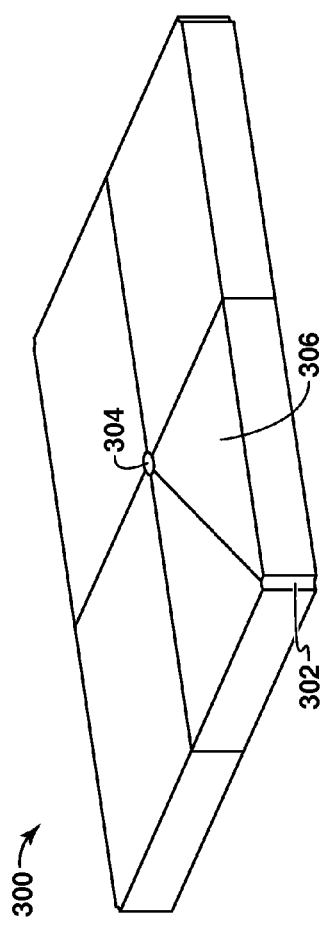
FIGS. 3A-3B are exemplary reservoir models that may be generated in the methods of FIGS. 1A-1B, including an injection well and a production well.
Figure 3B:
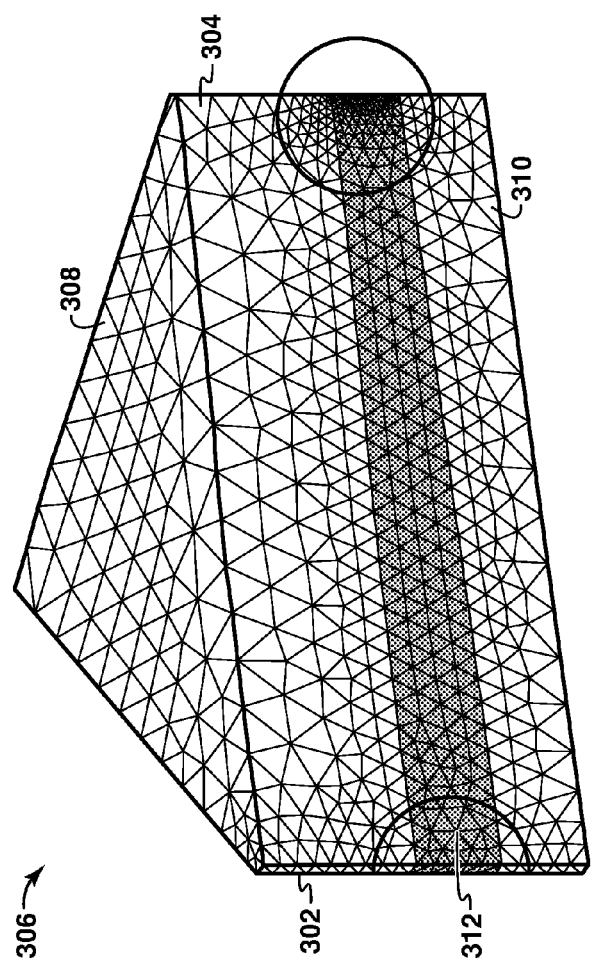

FIGS. 3A-3B are exemplary reservoir models of the reservoir of FIG. 2 generated using the methods of FIGS. 1A-1B, including an injection well and a production well. As such, FIGS. 3A-3B may be best understood with reference to FIGS. 1A-1B and 2. FIG. 3A shows reservoir 200 as a top isometric model 300 with an injection well (injector) 302, a production well (producer) 304. The model 300 is further divided to show a $\frac{1}{8}^{th}$ symmetrical division of the reservoir 306. FIG. 2B shows an isometric side view of the symmetrical portion of the model 306 with an exemplary mesh pattern. The model 306 includes an overburden 308 and an underburden 310 in addition to a production zone 312. The model 306 is an exemplary numerical model of the reservoir 200 as would be generated in steps 106 or 156.

In one exemplary approach to modeling the reservoir 200 using the methods 100 or 150 and the model 306, the reservoir effective stress (p') may be decreased by increasing the pore pressure through a fracture (e.g., fracture 208) created by injection (e.g., from injection well 302). The reservoir 200 may be homogeneous or heterogeneous with sand, shale and other geomaterials. The reduction of effective stress can be simulated using numerical modeling by increasing pore pressure. Depending on the depth, initial reservoir conditions, and other factors, the changes in the stress state of the reservoir during this conditioning phase may take on a predictable stress path that may be included in the reservoir model 306, 104, or 154.

Figure 4:
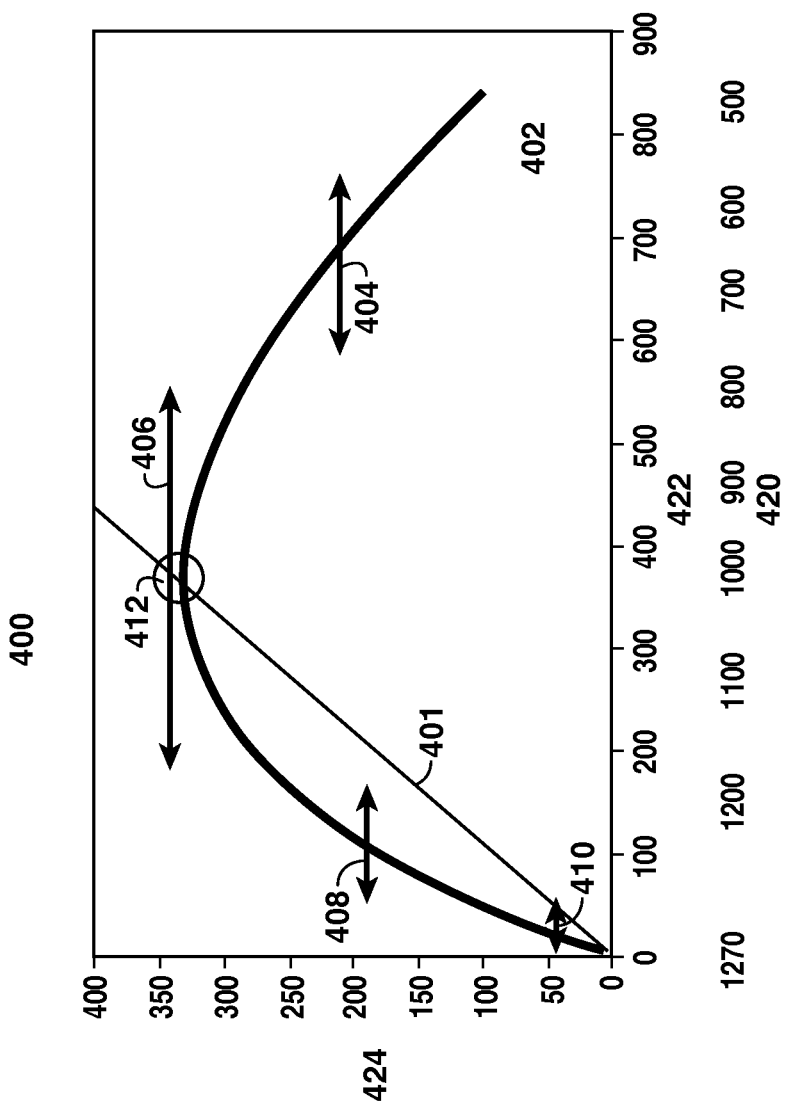
FIG. 4 is an illustration of a graph showing an exemplary stress path of a subterranean formation, like that shown in FIGS. 2 and 3, during a conditioning process.

FIG. 4 is an illustration of a graph showing an exemplary stress path of a subterranean formation, like the formations shown in FIGS. 2 and 3, during the conditioning portion of a hydrocarbon recovery process. As such, FIG. 4 may be best understood with reference to FIGS. 2 and 3. FIG. 4 shows a graph displaying an exemplary stress curve 400 relating the pore pressure 420, mean effective stress 422, and differential stress 424 (all measured in pounds per square inch (psi)) response as a production zone 204 or 312 is conditioned in a hydrocarbon recovery process. Also displayed is a critical state line (a property of the sand in the formation) 401 showing the relationship between differential and mean pressure at which the production zone 204 or 312 experiences no volume changes. As shown, the curve 400 begins at initial conditions 402 of about 825 pounds per square inch (psi) mean stress (overburden stress minus pore pressure), about 100 psi differential stress, and about 500 psi pore pressure. As the formation becomes slightly conditioned 404, then partially conditioned 406, the mean stress decreases as the pore pressure increases, and the differential stress increases until the point of mechanical failure 412 of the formation. At this point, the differential stress decreases and the mean stress decreases, while pore pressure increases through the mostly conditioned 408 and fully conditioned 410 stages. Both the differential and mean stresses go to zero when the formation is fully conditioned 410 while the pore pressure elevates. The increase in pore pressure imparts "drive energy" or "fluid energy" to the reservoir 204 or 312.

In one exemplary embodiment of the modeling methods 100 and 150, the integrated reservoir model is generated 104 or 154 at initial reservoir conditions 402 and generally follows a stress path similar to stress path 400 depending on the depth and characteristics of the formation 200 or 300 and reservoir 204 or 312. Depending on the particular production method to be modeled and the initial reservoir conditions, the conditioning step is modeled. In this step, fluid pressure in the reservoir is increased to the point of slight conditioning 404, partial conditioning 406, nearly full conditioning 408, or full conditioning 410. The conditioning step is present in FIRE, but not in CHOPS. Note that the conditioning step includes injection of significant amounts of fluids. These approaches may also applied to multiple wellbore systems (e.g., five spot pattern). One exemplary arrangement of wellbores is a "five spot pattern," a description of which may be found in Int'l Pat. App. WO2007/050180, the portions of which dealing with five spot patterns are hereby incorporated by reference.

After conditioning, there may be a slurry production step, which includes producing liquids (e.g., injection fluids such as water) and solids (e.g., sand) to increase reservoir access for the extended CHOPS processes. To model the slurry production step, the integrated reservoir model 300 should preferably be capable of simulating at least a volume of produced solids and fluids from the reservoir 312 to account for removal of significant quantities of solids and fluids.

After conditioning, processes such FIRE include a step of inducing a differential pressure between a pair or sets of pairs of wellbores. This causes fluid flow in the reservoir which drags the sand, bitumen, and water into one of the wells in the well pair(s). After a transition period, a sand and water slurry can then be reinjected into the other well in the well pair(s). To accurately simulate such a process, the integrated reservoir model 300 should preferably be capable of at least a simulation of movement of at least a volume of particulate solids and fluids 160 in the reservoir 312. The simulation should also be capable of simulating at least a volume of produced solids and fluids from the reservoir 312 and a volume of injected solids and fluids 110 into the reservoir 312.

Figure 5A:
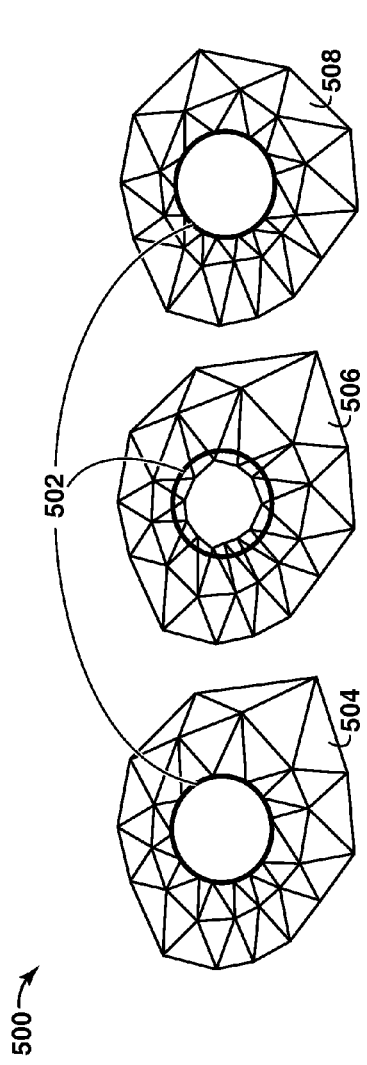
FIG. 5A is an illustration of a series of exemplary finite mesh updating around a producing well.
Figure 5B:
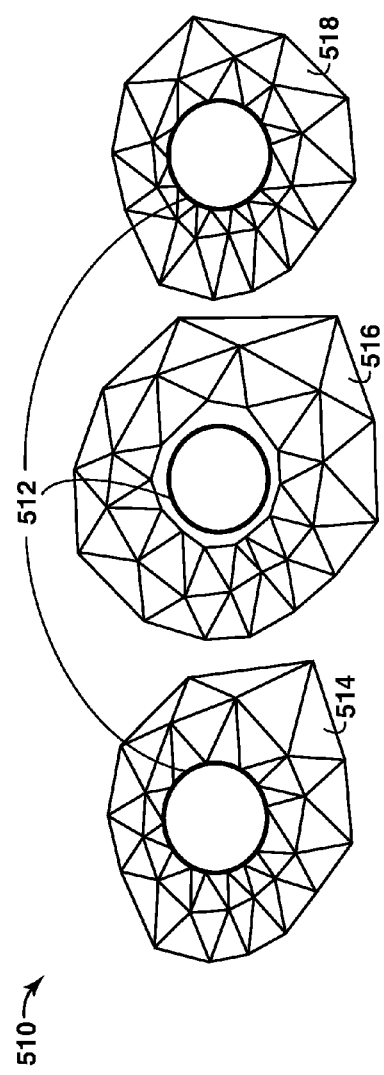
FIG. 5B is an illustration of a series of exemplary finite meshes around an injecting well.

FIG. 5A is an illustration of a series of exemplary finite meshes around a producing well like that shown in FIGS. 3A-3B as may be generated by the methods of FIG. 1A. FIG. 5B is an illustration of a series of exemplary finite meshes around an injecting well like that shown in FIGS. 3A-3B as may be generated by the methods of FIG. 1A. As such, FIGS. 5A and 5B may be best understood with reference to at least FIGS. 1A and 3A-3B. FIG. 5A shows finite element meshes 500 around a production well boundary 502. The first mesh is the initial mesh 504, the next mesh 506 is the mesh as material enters into the production wellbore 502, and the third mesh 508 is the new mesh after removing the material that entered into wellbore 502. Parts of finite elements may enter into the producer 502 due to various forces acting on them. The Eulerian boundary condition at the producer then "absorbs" the parts of the elements that enter into the producer 502. The area/volume of elements entered into the producer 502 is the sand produced at that time. In one embodiment, automatic mesh refinement may be used to make a new mesh such that no sand is within the producer 502. This process allows continuous sand production. Using the cumulative sum of area/volume of parts of the elements that enter into the producer 502, it is possible to compute temporal evolution of sand production.

FIG. 5B shows finite element meshes 510 around an injection well boundary 512. The first mesh is the initial mesh 514, the next mesh 516 shows the gap that develops between the reservoir 312 and the wellbore 512, and the third mesh 518 is the new mesh after filling the gap with injected material. The EBC at the injector 512 works similarly to the one at the producer 502. As sand and water are injected at the injector 512, a cavity is generated (i.e., sand elements near the injector 512 separate from the injector wellbore) in the mesh 516. Automatic mesh refinement may then be used to make a new mesh 518 such that the cavity near the injector 512 is filled (i.e., new material is injected into the model). The new material introduced can have different properties (e.g., porosity and permeability) than the native reservoir material. The EBC at the injector 512 allows simulation of continuous slurry injection into the model 300. The area/volume of the slurry injected can be calculated as cumulative area/volumes of the cavities created at different times. An advanced flow control model can be used for automatic pressure-flow rate match up at the Eulerian Boundary. With the advanced flow rate control, the model will be able to determine how much sand to be dragged into the reservoir automatically based on the total injection rate.

The Eulerian boundary conditions (EBCs) may provide at least one of the following advantages: (i) numerically removing sand produced into the wellbore thereby decreasing computational effort to deal with failed sand, (ii) allowing slurry (sand+fluid) to enter into reservoir via an injector as a different material, (iii) computing volumes and rates of produced and injected materials, and (iv) maintaining constant wellbore geometry.

During at least the steps of conditioning and slurry production, the pressure changes (e.g., as shown in exemplary curve 400) and fluid flow impose drag forces on sand particles and cause stress changes throughout the reservoir 312 especially near the producer 302 and injector 304. The pressure change also causes the reservoir 312 to deform, which in turn results in deformation of overburden 308 and underburden 310. The drag forces and associated stress changes in the reservoir model 300, underburden 308 and overburden 310 may be computed using the coupled geomechanics and fluid flow formulation given below:

$$\begin{bmatrix} K & L \\ L^T & -\Phi \Delta t \end{bmatrix} \begin{bmatrix} \Delta a \\ \Delta b \end{bmatrix} = \begin{bmatrix} \Delta r_1 \\ \Delta r_2 \end{bmatrix} \qquad \text{(Eq. 6)}$$

Where K and $\Phi$ are stiffness matrices of mechanical and seepage fields respectively, L is the mechanical-seepage fields coupling matrix, a and b are mechanical displacements and fluid pressures respectively, and $\Delta r_1$ and $\Delta r_2$ are external loads from mechanical and seepage fields, respectively.

Assuming that sufficiently large pressure gradients are applied to the reservoir (e.g., production zone) 312, sand begins to move when the drag force due to pressure gradient exceeds the frictional resistance of the sand in place. The geomechanics and fluid flow principles determine the extent of sand that is mobilized and ready to move. The sand movement depends on at least reservoir stress-state, friction angle and cohesion of sand, and the pressure gradient.

In some embodiments of the present invention an adaptive re-meshing technique may be incorporated 158b into the integrated reservoir model 300. For example, when deformations in the reservoir 312 are large (due to significant sand and fluid injection or production), the Jacobian (e.g., first order partial derivatives) of some of the finite elements in equation 5 may become very small or negative. The computational results using small or negative Jacobian are generally unreliable and may lead to inaccurate results. Hence, the mesh should be re-drawn, or adaptively re-meshed 158b. In this technique, when mesh quality (depending on the element Jacobian) drops below a certain threshold, a new mesh is created from the deformed configuration. All the results from the old mesh are mapped onto the new mesh and subsequent calculations are carried out on the new mesh. Beneficially, the automatic mesh refinement technique allows simulation of large movements of sand and fluid by eliminating distortion of the various finite element values. In other words, more accurate simulation of large sand and water movement is possible.

In an additional and alternative embodiment, an advanced constitutive model (ACM) may be incorporated 158a into the integrated reservoir model 300. The ACM includes mechanical and hydraulic constitutive behavior of materials. These models can account for the effect of different failure modes (e.g., shear failure, ductile failure, or tensile failure), volumetric response (e.g., compaction, dilation) and include a temporal element. FIG. 6A is an example of a critical state constitutive model, but other constitutive models, such as an advanced elasto-plastic critical state model may also be utilized.

FIG. 6A is an illustration of an exemplary graph showing various stress paths due to sand and water production and injection in a critical state constitutive model. The model 600 shows deviatoric stress 602 versus mean stress 604 in a steady stress state as shown by the initial yield surface 606 and the residual strength envelope 608. The stress changes cause some parts of reservoir to yield/fail in shear (AA') 610, some parts to yield/fail in ductile regime (BB') 612, and some parts to yield/fail in tension (CC') 614.

FIG. 6B is an illustration of an exemplary graph showing a rate-dependent version of the critical state constitutive model of FIG. 6A. As such, FIG. 6B may be best understood with reference to FIG. 6A. The model 600 shows deviatoric stress 602 versus mean stress 604 at an initial stress state yield surface 606 and a rate-dependant yield surface 606* in addition to a residual strength envelope 608. The rate dependent version of the critical state model 606* may be used to capture the physically observed variation in resistance to failure with rate of loading, and more importantly resistance to the flow of the destabilized material. As shown, the size of the rate-dependent yield surface ($P_c^*$) 606* is greater than the steady-state yield surface size ($P_c$) 606 and can be expressed as a function of the strain rate: $P_c^* = \Gamma(\dot{\epsilon})P_c$, where $\Gamma(\dot{\epsilon})$ is a strain rate function.

In some embodiments, more advanced constitutive models may be used for representation of the material behavior in the near-wellbore region, where the effective stress is extremely low. For example, the rate-dependent model 650 may be enhanced for shear rate dependency to capture the Bingham fluid like behavior of the granular media flow near the wellbore. Additionally, robust constitutive models that are stable at very low effective stresses may be used to model the movement of a sand slurry. Beneficially, many embodiments of the present invention combine different material models that are capable of capturing the physical material behavior at different constitutive (stress/strain) states.

The use of advanced material models arises because the reservoir 312 material starts as overconsolidated sand (initial state 606) experiences changes due to reservoir conditioning (e.g., fluid injection) and slurry production may become nearly structure free/failed sand (e.g., low K value from matrix equation 5). The subsequent movement of the reservoir 312 introduces regimes of low and high effective stresses. Such changes will also influence the permeability of the reservoir 312. Such complex behavior can be modeled using advanced elasto-plastic critical state models.

Though the numerical model 106 or 156 has been described using the finite element method, such a model can be developed using any combination of finite element method, discrete element method, finite volume method, and any combination thereof. The coupling of solids and fluids can be achieved using implicit schemes, explicit schemes, Eulerian methods, Lagrangean methods or any combinations thereof.

EXAMPLES

The following example shows the combined use of automatic mesh refinement 158b, EBC 108, and large strain formulations of geomechanics and fluid flow formulations 158a for simulating large sand/water production and injection volumes. The following analyses were carried out using the ELFEN (Rockfield 2007) suit of finite element software.

A hypothetical formation 300 of 60 m wide, 60 m long and 10 m thick was selected. There are four injectors 302 at four corners, 60 m from each other, and a producer 304 in the middle (e.g., a "five spot" pattern). A ⅛th symmetrical model 306 of the formation 300, using appropriate boundary conditions, is sufficient to represent the entire formation 300. The ⅛th symmetrical model 306 includes the overburden 308 and the underburden 310 above and below the reservoir 312. The radii of injector 302 and producer 304 were assumed to be 1 m.

The first step in the analyses is conditioning of reservoir 312, which can be simulated using solid-fluid coupled finite element code. Formation 200 shows an exemplary reservoir 204 for the conditioning step. The conditioning process increases pore pressure 420 causing mean stress 422 to decrease and shear stress 424 to increase initially. After reaching peak state 412, shear stress 400 and mean stress 422 decrease and stress state 400 in the reservoir 312 or 204 at the end of conditioning will be small (e.g., 100 kPa).

The fully conditioned stress state 410 in the reservoir 312 was at an initial vertical and horizontal effective stresses of 100 kPa and 120 kPa. The initial pore pressure 420 in the model was 3900 kPa and this was balanced by 4000 kPa of vertical load acting on the top of the overburden 308. The model 306 was supported using zero normal displacement boundary conditions on all surfaces except the top surface.

The initial equilibrium 402 was disturbed by decreasing pore pressure 420 at the producer 304 from 3900 kPa to 2950 kPa. The pore pressure 420 at the injector 302 was increased to 4900 kPa. The injector 302 was assumed to be filled with slurry (mixture of water and sand) with 10 times higher permeability than the reservoir 312 and the slurry was at 4900 kPa of pressure.

The pressure gradient between the producer 304 and the injector 302 results in sand production at the producer 304. The production of sand at the producer 304 increases the porosity of the sand in the reservoir 312 and eventually leads to a cavity near the injector 302. The creation of the cavity and the pore pressure gradient between the producer 304 and injector 302 drags the slurry in the wellbore into the reservoir 312.

Figure 7:
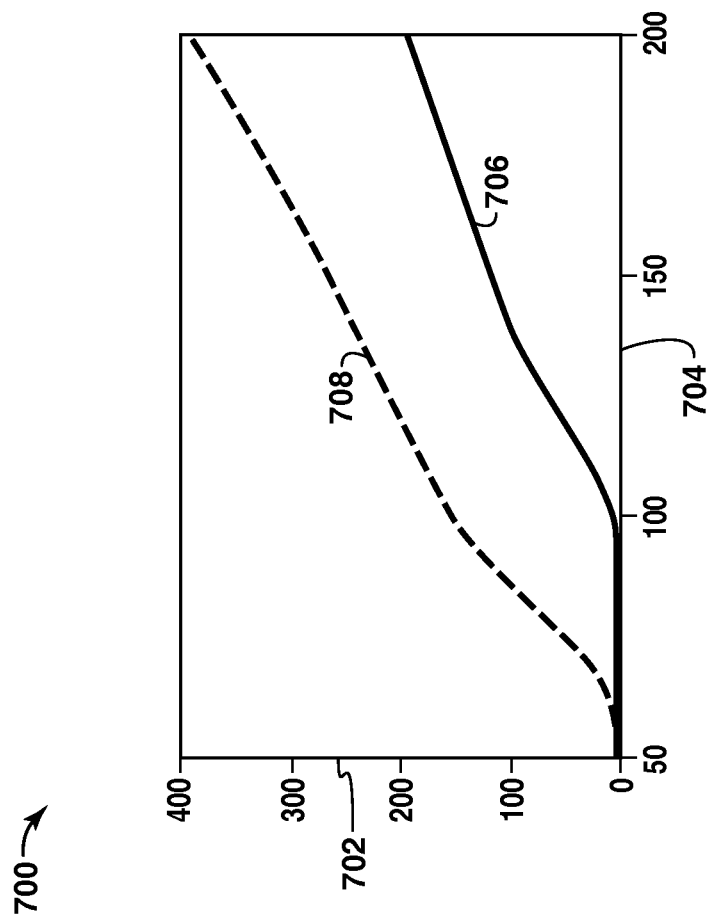
FIG. 7 is a graphic representation of the amount of sand produced at the producer and sand injected at the injector for the example.

FIG. 7 is a graphic representation of the amount of sand produced at the producer and sand injected at the injector for the example. The graph 700 displays sand volume in cubic meters (m³) 702 versus time in hours 704 for a sand injector 706 and a sand producer 708. As shown, about 400 m³ of sand is produced in 8.3 days. The total sand in reservoir model is about 3,100 m³ and in 8.3 days 13% of sand in the reservoir 312 was produced. Such high volumes and rates of sand production are not typical and the technique described here is numerically capable of producing such rates.

Figure 8:
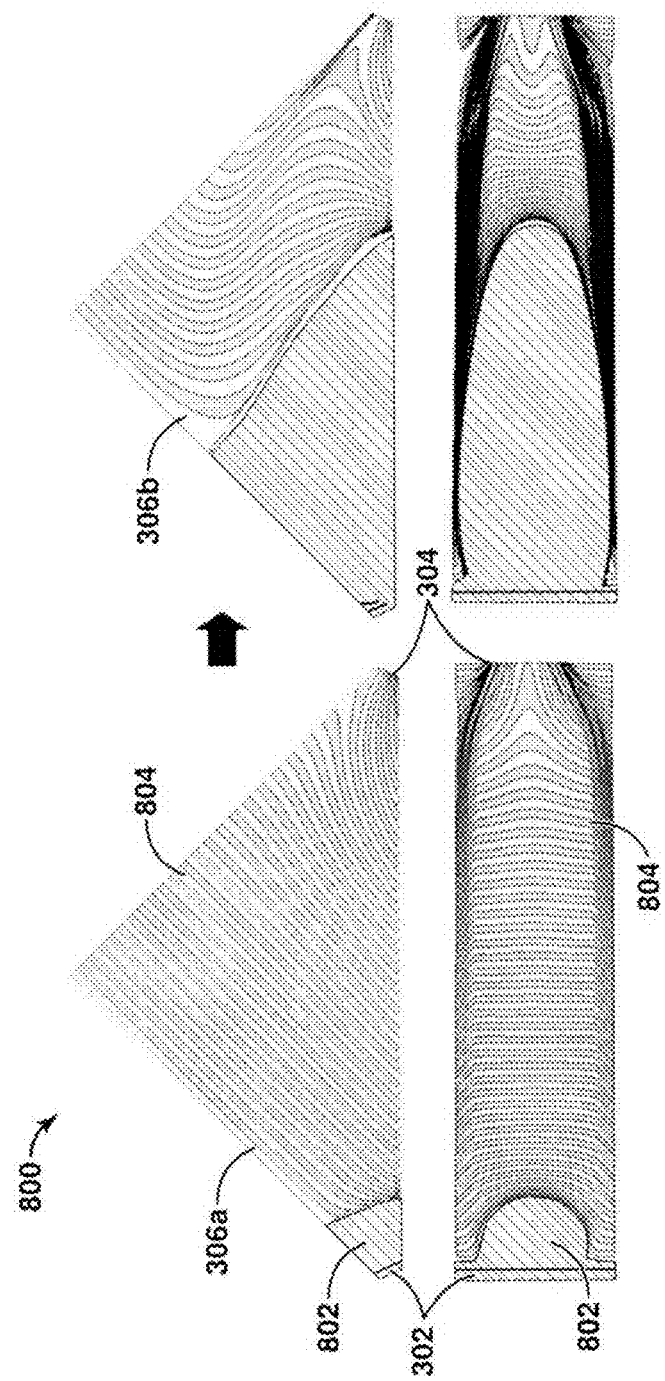
FIG. 8 is an illustration of an exemplary visualization of sand production and sand injection in a formation as shown in FIGS. 3A-3B.

FIG. 8 is an illustration of an exemplary visualization of sand production and sand injection in a formation as shown in FIGS. 3A-3B. As such, the illustration of FIG. 8 may be best understood with reference to FIGS. 3A-3B. The illustration 800 shows a ⅛th symmetrical view of the reservoir 306 in two states, an early injection state 306a and an advanced injection state 306b. The left corner is the injector 302, and the right corner is the producer 304. The solid area 802 is injected sand and water, and the area having lined gradiations 804 is the sand and water slurry mixed with reservoir geomaterials. The material grid 800 shows the sand movement, sand injection and sand production in the process.

Figure 9:
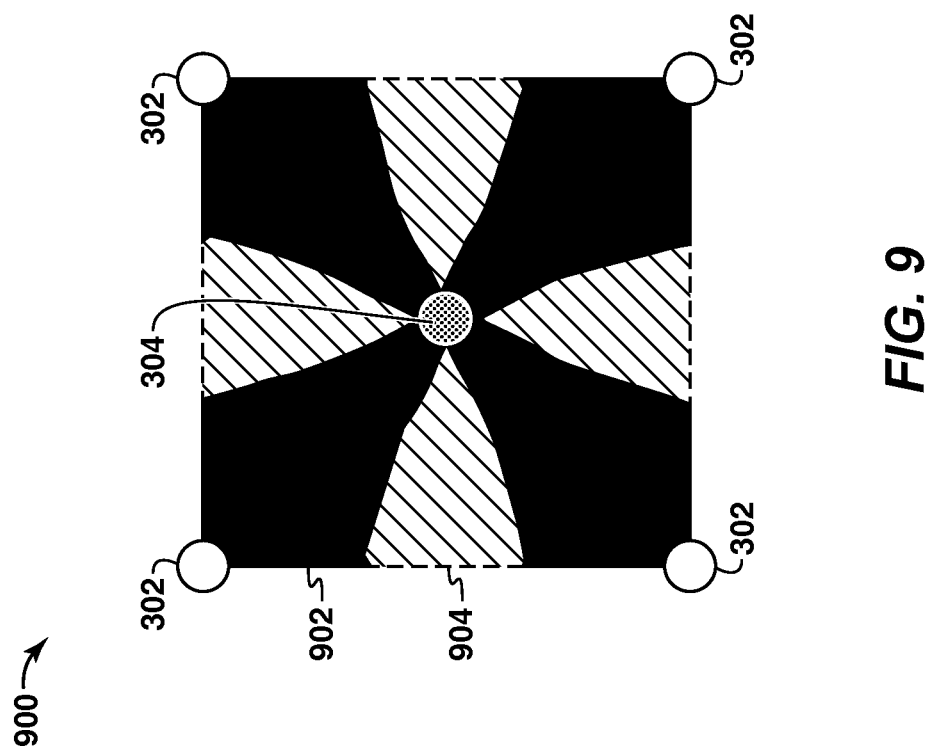
FIG. 9 is an illustration of an exemplary final sweep pattern of an exemplary reservoir area that has been subjected to sand production as shown in FIG. 8 and based on the exemplary simulation results.

FIG. 9 is an illustration of an exemplary final sweep pattern of an exemplary reservoir area that has been subjected to sand production as shown in FIG. 8 and based on the exemplary simulation results. As such, FIG. 9 may be best understood with reference to FIG. 8. The illustration 900 shows the full reservoir 300 after a full injection cycle as modeled in FIG. 8. The wells are in a "five-spot" pattern with four injectors 302 at the corners and a producer 304 in the middle. The solid area 902 is the injected fluid and sand slurry (e.g., swept area) and the hatched area 904 is the remaining sand and reservoir geomaterials (e.g., unswept area). Note, that a significant amount of the sand is also produced from the unswept area 904, which results in a sweep efficiency higher than 60%.

While the present invention may be susceptible to various modifications and alternative forms, the exemplary embodiments discussed above have been shown only by way of example. However, it should again be understood that the invention is not intended to be limited to the particular embodiments disclosed herein. Indeed, the present invention includes all alternatives, modifications, and equivalents falling within the true spirit and scope of the appended claims.

What is claimed is:

1. A method for reservoir modeling, comprising:
generating an integrated reservoir model, comprising:
building a numerical model of a reservoir having at least one injection well and at least one producing well; and
using a Eulerian boundary condition with each of the at least one injection well and the at least one producing well;
generating a simulation result from the integrated reservoir model, wherein the simulation result includes at least a volume of produced fluids and produced particulate solids from the reservoir and a volume of injected fluids and injected particulate solids into the reservoir;
applying a fluids-solids coupling technique to the integrated reservoir model; and
generating drag forces and associated stresses in the reservoir using the fluids-solids coupling technique using the formulation:

$$\begin{bmatrix} K & L \\ L^T & -\Phi \Delta t \end{bmatrix} \begin{bmatrix} \Delta a \\ \Delta b \end{bmatrix} = \begin{bmatrix} \Delta r_1 \\ \Delta r_2 \end{bmatrix}$$

where K and $\Phi$ are stiffness matrices of mechanical and seepage fields respectively, L is the mechanical-seepage fields coupling matrix, a and b are mechanical displacements and fluid pressures respectively, $\Delta r_1$ and $\Delta r_2$ are external loads from mechanical and seepage fields respectively.

2. The method of claim 1, further comprising:
using an advanced constitutive model with the integrated reservoir model, wherein the simulation result further includes at least a simulation of movement of at least a volume of particulate solids and fluids in the reservoir.

3. The method of claim 2, further comprising:
using an adaptive re-meshing technique with the integrated reservoir model, wherein the adaptive re-meshing technique is configured to produce at least a simulation of movement of at least a volume of particulate solids and fluids in the reservoir.

4. The method of claim 1, further comprising:
using an adaptive re-meshing technique with the integrated reservoir model, wherein the simulation result further includes at least a simulation of movement of at least a volume of particulate solids and fluids in the reservoir.

5. The method of claim 1, wherein the particulate solids are selected from the group consisting of sand, large asphaltenes, in-situ geo-materials, shale, and any combination thereof.

6. The method of claim 1, wherein the fluids are selected from the group consisting of aqueous fluids, gaseous fluids, hydrocarbon liquids, and any combination thereof.

7. The method of claim 1, further comprising applying the integrated reservoir model to at least a portion of a hydrocarbon extraction process.

8. The method of claim 7, wherein the portion of the hydrocarbon extraction process is selected from the group consisting of slurry injection, sand production, reservoir conditioning, wormhole generation, hydrocarbon production, and any combination thereof.

9. The method of claim 7, wherein the hydrocarbon extraction process is selected from the group consisting of Cold Heavy Oil Production with Sand (CHOPS), Fluidized In-situ Reservoir Extraction (FIRE), and any combination thereof.

10. The method of claim 1, further comprising applying the integrated reservoir model to simulate at least one of sweep efficiency and general sand production.

11. The method of any claim 1, further comprising applying a numerical simulation technique to the integrated reservoir model, wherein the numerical simulation technique is selected from the group consisting of a finite element method, a discrete element method, a finite volume method, and any combination thereof.

12. The method of claim 2, wherein the advanced constitutive model is configured to incorporate at least two material models, wherein each of the at least two material models is configured to capture a physical material behavior at a unique physical state.

13. The method of claim 12, wherein the unique physical state is selected from the group consisting of a shear state, a ductile state, and a tensile state, and any combination thereof.

14. The method of claim 13, wherein the advanced constitutive model utilizes an advanced elasto-plastic critical state model.

15. The method of claim 14, wherein the advanced elasto-plastic critical state model is a rate dependent model.

16. The method of claim 1, further comprising incorporating an overburden and an underburden into the numerical model of the reservoir.

17. The method of claim 1, further comprising incorporating at least one of a heterogeneous zone and a fracture zone in the numerical model of the reservoir.

18. The method of claim 1, further comprising incorporating at least one variable physical condition in the finite model of the reservoir, wherein the at least one variable physical condition is selected from the group consisting of fluid pressure, reservoir permeability, reservoir pressure gradient, particulate solid stress, fluid flow rates, particulate solid production rates, particulate solid injection rates, reservoir stress-state, friction angle of sand, cohesion of sand, and any combination thereof.

19. The method of claim 1, wherein the numerical model is a representative symmetrical model of a portion of the reservoir.

20. The method of claim 1, wherein the reservoir consists of homogeneous sand or heterogeneous elements.

21. A method for reservoir modeling, comprising:
generating an integrated reservoir model, comprising:
building a numerical model of a reservoir; and
using an advanced constitutive model with the integrated reservoir model;
generating a simulation result from the integrated reservoir model, wherein the simulation result includes at least a simulation of movement of at least a volume of particulate solids and fluids in the reservoir;
applying a fluids-solids coupling technique to the integrated reservoir model; and
generating drag forces and associated stresses in the reservoir using the fluids-solids coupling technique using the formulation:

$$\begin{bmatrix} K & L \\ L^T & -\Phi\Delta t \end{bmatrix} \begin{bmatrix} \Delta a \\ \Delta b \end{bmatrix} = \begin{bmatrix} \Delta r_1 \\ \Delta r_2 \end{bmatrix}$$

where K and $\Phi$ are stiffness matrices of mechanical and seepage fields respectively, L is the mechanical-seepage fields coupling matrix, a and b are mechanical displacements and fluid pressures respectively, $\Delta r_1$ and $\Delta r_2$ are external loads from mechanical and seepage fields respectively.

22. A method for reservoir modeling, comprising:
generating an integrated reservoir model, comprising:
building a numerical model of a reservoir; and
using an adaptive re-meshing technique with the integrated reservoir model;
generating a simulation result from the integrated reservoir model, wherein the simulation result includes at least a simulation of movement of at least a volume of particulate solids and fluids in the reservoir;
applying a fluids-solids coupling technique to the integrated reservoir model; and
generating drag forces and associated stresses in the reservoir using the fluids-solids coupling technique using the formulation:

$$\begin{bmatrix} K & L \\ L^T & -\Phi\Delta t \end{bmatrix} \begin{bmatrix} \Delta a \\ \Delta b \end{bmatrix} = \begin{bmatrix} \Delta r_1 \\ \Delta r_2 \end{bmatrix}$$

where K and $\Phi$ are stiffness matrices of mechanical and seepage fields respectively, L is the mechanical-seepage fields coupling matrix, a and b are mechanical displacements and fluid pressures respectively, $\Delta r_1$ and $\Delta r_2$ are external loads from mechanical and seepage fields respectively.

23. The method of any one of claims 21 and 22, further comprising:
adding at least one injection well and at least one producing well to the numerical model;
using a Eulerian boundary condition with each of the at least one injection well and the at least one producing well; and
incorporating at least a volume of produced fluids and produced particulate solids from the reservoir and a volume of injected fluids and injected particulate solids into the reservoir into the simulation result.

24. A computer program product, comprising a computer usable non-transitory medium having a computer readable program code embodied therein, said computer readable program code adapted to be executed to implement a method for reservoir modeling, said method comprising:
generating an integrated reservoir model, comprising:
building a numerical model of a reservoir;
using an adaptive re-meshing technique with the integrated reservoir model;
adding at least one injection well and at least one producing well to the numerical model; and
using a Eulerian boundary condition with each of the at least one injection well and the at least one producing well; and
generating a simulation result from the integrated reservoir model, wherein the simulation result includes at least a simulation of movement of at least a volume of particulate solids and fluids in the reservoir;
incorporating at least a volume of produced fluids and produced particulate solids from the reservoir and a volume of injected fluids and injected particulate solids into the reservoir into the simulation result;
applying a fluids-solids coupling technique to the integrated reservoir model; and
generating drag forces and associated stresses in the reservoir using the fluids-solids coupling technique using the formulation:

$$\begin{bmatrix} K & L \\ L^T & -\Phi\Delta t \end{bmatrix} \begin{bmatrix} \Delta a \\ \Delta b \end{bmatrix} = \begin{bmatrix} \Delta r_1 \\ \Delta r_2 \end{bmatrix}$$

where K and $\Phi$ are stiffness matrices of mechanical and seepage fields respectively, L is the mechanical-seepage fields coupling matrix, a and b are mechanical displacements and fluid pressures respectively, $\Delta r_1$ and $\Delta r_2$ are external loads from mechanical and seepage fields respectively.

* * * * *